3,252,938
PROCESS FOR THE PRODUCTION OF POLYOXYMETHYLENES

Hermann Richtzenhain, Cologne-Sulz, Paul Janssen, Cologne, and Rudolf Cordes, Ranzel uber Troisdorf, Germany, assignors to Dynamit Nobel Aktiengesellschaft, Troisdorf, Germany, a corporation of Germany
No Drawing. Filed Mar. 1, 1962, Ser. No. 176,793
Claims priority, application Germany, Mar. 4, 1961, D 35,560
8 Claims. (Cl. 260—67)

This invention is concerned with the production of novel, thermostable polyoxymethylenes. More particularly, it is directed to the production of trioxane polymerizates by the polymerization of trioxane in the presence of Lewis-acid type catalysts and orthoesters of organic acids.

The polymerization of trioxane in the presence of catalysts to form high molecular weight polyoxymethylenes is known. However, the polyoxymethylenes which are produced from trioxane are not thermally stable, and the same is true in the case of polyoxymethylene polymers which are produced by polymerization of monomeric formaldehyde as semi-formals, both forms of polymers undergoing decomposition on heating with the splitting-off of formaldehyde. The fact that the polyoxymethylene polymers evidence this decomposition forms the basis for the failure to employ polyoxymethylenes for technical and commercial applications. Numerous attempts have been made to improve the thermal stability of polyoxymethylenes and, specifically, attempts have been directed to reacting the semi-acetalic terminal groups which are directly responsible for the polymers' instability, as, for example, by esterification or etherification, so that, when heat is used, the polymers no longer tend to decomposition with a consequent loss of formaldehyde. The fixing of the terminal groups, however, requires an additional processing step and results in that the polymeric products produced are more expensive.

It is an object of the invention to provide a new, practically feasible process for the production of thermally stable polymethylene polymers.

Another object of the invention is to provide novel, thermally stable polyoxymethylene polymers.

The above and other objects will become more fully apparent in the course of the following description:

In accordance with the present invention, it has been discovered that trioxane can be polymerized to form polyoxymethylene polymers of improved thermal stability if the polymerization reaction is carried out in the presence of an ortho-ester of an organic acid and of a Lewis-acid, a complex or salt thereof as catalyst. The ortho-ester of the organic acid is preferably added after the polymerization reaction per se has been initiated and, most preferably, in admixture with a portion of the catalyst. The addition of the ortho-ester of the organic acid in this fashion results in the formation of more completely and better fixed semi-acetalic terminal groups in the resulting polyoxymethylenes. Again, in accordance with this invention, polyoxymethylene polymers formed by the process of the invention are of a more stable character than the similarly constituted polymers heretofore known and may be employed without further modification without undergoing thermal decomposition.

The trioxane required for the polymerization must be of a high degree of purity and is suitable for use if it contains only traces of impurities, as, for example, of water, formic acid, and the like. Trioxane having less than 0.01% water is preferred for use in the polymerization. The trioxane may be polymerized in the presence of solvents or dispersion agents in which case the quantity of solvent or dispersion agent used may amount to up to 95% of the trioxane used. Solvents which have been found exceptionally useful include aliphatic, aromatic, and cycloaliphatic hydrocarbons, chlorinated hydrocarbons, ethers, esters, nitriles, etc.

The catalysts which are to be used in accordance with the invention are of the type of the Lewis-acids, such as, for example, boron trifluoride, tin-tetrachloride, antimony pentachloride, etc. These materials may be used per se or in the form of their complex compounds or salts. Boron trifluoride has been exceptionally useful as a catalyst. It can be used as such or in the form of its etherate as, for example, its etherate with diethyl ether or tetrahydrofurane or, alternatively, as a complex formed with, for example, an amine, such as diethyl or diphenylamine, or as a salt, such as exemplified by a triethyl-oxonium-boron fluoride or a diazonium-boron fluoride. The amount of catalyst employed may be varied within a certain range according to the properties desired for the polymerizate product, the specific catalytic activity, the type and quantity of the solvent present, and also the degree of purity of the trioxane used as starting material. It has, for example, been found advantageous to employ a boron trifluoride etherate catalyst in an amount of $1.10^{-1}$ to $1.10^{-4}\%$, referred to the trioxane present in the polymerization mixture.

The orthocarboxylic acid esters which may be used are well known in the art and include esters of aliphatic, aromatic, and heterocyclic carboxylic acids, the hydrogen atoms of which may be substituted by halogen atoms, alkoxy groups or t.-amine groups. The alcohol component of the ortho-esters preferably is derived from a lower aliphatic alcohol. However, it is not limited to such alcohols. It has been found that particularly desirable effects are observed with the ortho-esters of formic acids and, in particular, with the ortho-methyl esters of formic acid. Mixed ortho-esters may also be employed herein.

The amount of the indicated ortho-ester added may fluctuate between 0.1 and 15%.

The degree of purity and the quantity of the ortho-ester, as well as the time of its addition, have a marked influence on the molecular weight of the final polymerizate. To a similar effect are the type and quantity of the catalyst used.

After completion of the polymerization reaction, the catalyst is removed from the polymerizate by treatment thereof with suitable solvents. The solvent used for removal of the catalyst may additionally contain basic materials, such as ammonia or ethanolamine.

The polyoxymethylene polymers obtained in accordance with the invention demonstrate in the form of their 0.5% solution in p-chlorophenol, which still contains 2% α-pinene, at 60° C. reduced viscosities of 0.5 and higher. Polymeric products obtained by addition of the ortho-esters to the polymerization mixture prior to initiation of polymerization reaction are all characterized by a lower viscosity.

The following examples are given by way of illustration and not limitation, it being understood that wide deviations are possible in ingredients, proportions, temperatures, etc., without departing from the spirit of the invention:

Example 1

100 g. of trioxane in 50 ml. cyclohexane are melted down in a nitrogen atmosphere in a 3-necked flask provided with a stirrer, reflux cooler and dropping funnel, and the trioxane thereafter polymerized in the presence of 2.8 ml. of a catalyst solution prepared from 0.625 ml. of a freshly distilled boron-trifluoride etherate and 100 ml. of dry diethyl ether. Immediately after polymerization has been initiated, as may be recognized by the appearance of turbidity in the trioxane-cyclohexane melt, there is added, in a dropwise fashion, over a 2-hour period from the dropping funnel, 5 g. of ortho-formic-acid-trimethyl ester, which has been dissolved in 45 ml. cyclohexane and a further 1.4 ml. of a catalyst solution. A temperature of 70° C. is maintained without stirring for a period of 3 hours. Thereafter, the mixture is permitted to cool and the polymerizate formed is pulverized and twice extracted with methanolic ethanolamine solution (2%). The polyoxymethylene polymerizate is thereafter washed with acetone and dried for 24 hours in vacuo at 60° C. The resulting product has a reduced viscosity of 0.88 and at 200° C., under nitrogen, demonstrates a loss in weight of 0.15% per minute.

In a further run, the ortho-formic acid trimethyl-ester is added under otherwise identical conditions but before the polymerization reaction has been started. There is thereby obtained a polymerizate characterized by reduced viscosity of 0.2.

A further run similarly carried out but without introducing any ortho-formic-acid-trimethyl-ester results in the formation of a product which at 200° C. under nitrogen demonstrates a weight loss of 0.24% per minute.

*Example 2*

In a 3-necked flask equipped with a stirrer, reflux cooler, and dropping funnel, and which has been heated to 70° C., and thereafter maintained at 50° C., 20 g. trioxane in 10 ml. cyclohexane are melted down in a dry nitrogen atmosphere, and thereafter the trioxane is polymerized, in the presence of, as catalyst, 0.56 ml. of boron-trifluoride-etherate solution described in Example 1. After the solution becomes turbid, there is added dropwise, under stirring, a solution of 70 g. trioxane, 4.5 g. ortho-formic-acid-dimethylethyl ester and 3.22 ml. of a catalyst solution in 80 ml. cyclohexane over a 2-hour period. The polymerization mixture is stirred for 10 more hours at 65° C. The dry polymerizate which is obtained is pulverized and worked up substantially as set out in Example 1. The yield of polyoxymethylene polymer amounts to 65% of the theoretical, the reduced viscosity to 0.53, the loss in weight at 200° C. in a nitrogen atmosphere to 0.1% per minute.

A product produced in a run carried out as just described but in which the ortho-ester is introduced initially with the catalyst to the polymerization mixture has a viscosity of 0.04.

A polymeric product prepared in another run, carried out as first described but without any ortho-ester, demonstrates at, 200° C. under nitrogen, a loss in weight of 0.25% per minute.

*Example 3*

In a 3-necked flask equipped with a stirrer, reflux cooler and dropping funnel, and which has been heated to 70° C., 100 g. of trioxane in 80 ml. of cyclohexane are melted down in a dry nitrogen atmosphere and polymerized in the presence of 2.1 ml. of the boron-trifluoride etherate catalyst solution described in Example 1. After the polymerization has started, there is added dropwise, over a period of 2 hours under stirring from the dropping funnel, 5 g. of dichloro-ortho-acetic-acid-trimethyl-ester in 20 ml. of cyclohexane and a further 2.1 ml. of the catalyst solution. The polymeric conditions and a temperature of 65° C. are maintained for a further 10 hours and the polymerizate formed is, after cooling, pulverized. The polymerizate is further worked up, as has been set out in Example 1. There is obtained in 65% yield a product having a reduced viscosity of 0.75 and which at 200° C. in a nitrogen atmospheric demonstrates a loss in weight of 0.15% per minute.

A product which has been obtained in a similar run but in which the ortho-ester is added before polymerization is commenced has a viscosity of 0.3.

Another run in which trioxane is polymerized under substantially similar conditions but without addition of any ortho-ester results in a product showing at 200° C. under nitrogen a loss in weight of 0.23% per minute.

*Example 4*

100 g. trioxane in 25 ml. of cyclohexane are melted down at 70° C. in a nitrogen atmosphere in a 3-necked flask equipped with a stirrer, dropping funnel and reflux cooler, and thereafter treated with 1.4 ml. of a catalyst solution described in Example 1. After polymerization has started up, there is added dropwise, using the dropping funnel, 10 ml. cyclohexane, 3 g. orthoformic-acid-trimethyl ester and 1.4 ml. of a catalyst solution. The polymerization flask is maintained at a temperature of 60° C. for a period of 24 hours, and thereafter the polymerization product is recovered and worked up, as has been set out in Example 1. The polyoxymethylene which is thus obtained has a viscosity of 0.74 and at 200° C. under nitrogen shows a weight loss of 0.18% per minute.

*Example 5*

36 g. trioxane in 180 ml. of cyclohexane are melted down in an enameled stirring autoclave at 80° C. in a nitrogen pressure of 2 atmospheres. Polymerization is initiated by introduction of 10 ml. of a catalyst solution, as set out in Example 1, into the autoclave. After the polymerization reaction has been initiated, there is introduced, under stirring into the reaction vessel over a 2 hour period, 18 g. ortho-benzoic-acid-trimethyl ester in 90 ml. cyclohexane and 5 ml. of a catalyst solution. The polymerization conditions are maintained for a further 10 hours at a temperature of 70° C. and thereafter the polymerizate formed is recovered and worked up as described in Example 1. The yield of polyoxymethylene amounts to 82%. The viscosity of the polymer is 0.81, the loss in weight at 200° C. under nitrogen amounts to 0.09% per minute.

The product obtained in a similar run but in which the ortho-ester is added before the polymerization has commenced has a viscosity of 0.21. A product similarly obtained but without the use of any ortho-ester has at 200° C. a loss in weight of 0.26% per minute.

We claim:

1. Process of preparing thermostable polyoxymethylenes comprising polymerizing trioxane in the presence of 0.1–15% referred to the trioxane of a member selected from the group consisting of ortho-formic-acid-trimethyl ester, ortho-formic acid-dimethyl-ethyl ester, dichloro-ortho-acetic-acid-trimethyl ester and ortho-benzoic-acid-trimethyl ester, and $1.10^{-1}$ to $1.10^{-4}\%$ referred to the trioxane of a member selected from the group consisting of boron trifluoride, tin tetrachloride, antimony pentachloride, and the complexes thereof with a member selected from the group consisting of ethers and amines, as catalyst, wherein said ortho-ester of said organic carboxylic acid is added only after the polymerization reaction has been initiated but before the completion thereof, maintaining the temperature during said polymerization at about a constant point, and recovering the polyoxymethylene thereby formed.

2. Process according to claim 1, wherein said catalyst is a complex of boron trifluoride with a member selected from the group consisting of diethyl ether, tetrahydrofuran, diethylamine, and diphenylamine.

3. Process according to claim 1, wherein said catalyst is introduced in portions of the total amount during polymerization and said ortho-ester of an organic acid is introduced with said catalyst once the polymerization reaction has been initiated.

4. Process according to claim 1, wherein said polymerization is carried out in the presence of an inert organic liquid which is a member selected from the group consisting of aliphatic, organic, and cycloaliphatic hydrocarbons, chlorinated hydrocarbons, ethers, esters and nitriles, which is a solvent for the trioxane.

5. Process according to claim 1, wherein said catalyst is a boron-trifluoride etherate and said ortho ester of an organic ester is an ortho-methyl-ester of formic acid.

6. Process according to claim 1, wherein said catalyst is a boron-trifluoride etherate and said ortho ester of an organic acid is the ortho-dimethyl-ethyl-ester of formic acid.

7. Process according to claim 1, wherein said catalyst is a boron-trifluoride etherate and said ortho ester of an organic acid is the ortho-dichloro-trimethyl ester of acetic acid.

8. Process according to claim 1 wherein said catalyst is a boron-trifluoride etherate and said ortho-ester of an organic acid is the ortho-trimethyl ester of benzoic acid.

References Cited by the Examiner

UNITED STATES PATENTS

| | | | |
|---|---|---|---|
| 2,989,508 | 6/1961 | Hudgin | 260—67 |
| 3,017,389 | 1/1962 | Langsdorf et al. | 260—67 |
| 3,030,338 | 4/1962 | Aries | 260—67 |
| 3,135,718 | 6/1964 | Wagner et al. | 260—67 |

FOREIGN PATENTS

| | | |
|---|---|---|
| 877,256 | 9/1961 | Great Britain. |
| 1,243,668 | 9/1960 | France. |

OTHER REFERENCES

Bayer: Derwent Belgian Patents Report, 62A, February 1960, p. A22, Note #583,593.

Du Pont: Ibid, 66A, July 1960, p. Cl6, Note #584,924.

Vogl: Chemistry and Industry, June 3, 1961, pp. 748–749.

WILLIAM H. SHORT, *Primary Examiner.*

JOSEPH R. LIBERMAN, *Examiner.*